United States Patent [19]

Nozawa et al.

[11] Patent Number: 4,600,985
[45] Date of Patent: Jul. 15, 1986

[54] NUMERICAL CONTROL METHOD AND APPARATUS THEREFOR

[75] Inventors: Ryoichiro Nozawa, Tokyo; Hideaki Kawamura; Takao Sasaki, both of Hachioji; Satoru Hirose, Hino, all of Japan

[73] Assignee: Fanuc Ltd., Minamitsuru, Japan

[21] Appl. No.: 499,377

[22] Filed: May 31, 1983

[30] Foreign Application Priority Data

Jun. 1, 1982 [JP] Japan .................................. 57-93500

[51] Int. Cl.$^4$ ............................................ G05B 19/405
[52] U.S. Cl. .................................... 364/169; 318/571; 364/174; 364/180; 364/474
[58] Field of Search ................ 364/167, 168, 169, 170, 364/174, 191, 474, 475, 180, 182; 318/570, 571, 573, 574, 590, 592

[56] References Cited

U.S. PATENT DOCUMENTS 3,058,657 10/1962 Tripp .................................... 235/154
3,866,179 2/1975 McGee et al. .................... 364/170 X
4,250,438 2/1981 Onoda .............................. 364/174 X

FOREIGN PATENT DOCUMENTS 0068029 1/1983 European Pat. Off. .

OTHER PUBLICATIONS

European Search Report, The Hague, May 28, 1985, Examiner: Cornillie.

Primary Examiner—Joseph Ruggiero
Assistant Examiner—Allen MacDonald
Attorney, Agent, or Firm—Staas & Halsey

[57] ABSTRACT

First and second tool control blocks respectively precede and follow a corner on a tool path. A pulse distribution computation based on NC command data in the second block is not executed at the instant that a pulse distribution computation based on NC command data in the first block ends. Rather, a pulse distribution computation based on the NC command data in the second block is performed starting at the instant that a feed speed based on the NC command data in the first block is reduced to a prescribed speed by being decelerated. As a result, the torch of a gas cutting machine or the like will cut the corner portion quickly with a high degree of accuracy and without cutting the corner to an overly rounded shape.

9 Claims, 13 Drawing Figures

NUMERICAL CONTROL METHOD AND APPARATUS THEREFOR

BACKGROUND OF THE INVENTION

This invention relates to a numerical control method and apparatus suitable for application to the cutting of corner portions by a gas or plasma cutting machine.

Figure 1:
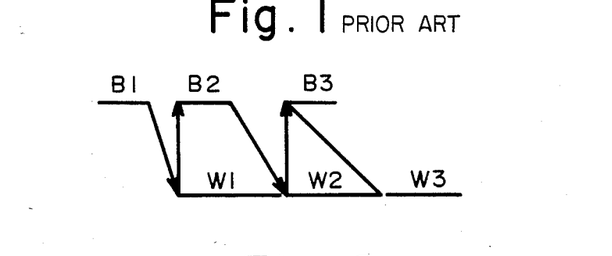
FIG. 1 is diagram depicting the prereading of data.

A so-called data prereading technique is used as a method of reading data in a numerical control apparatus. In a method which does not rely upon the prereading technique, a succeeding block of NC data is read each time machining or movement based on the preceding block ends. This is followed by a format check, decoding, calculation of an amount of movement (incremental values) and by other preprocessing, after which machining or movement is controlled based upon the succeeding block. With this conventional method, however, machining efficiency declines because processing cannot keep up with the action of the machine tool due to the time required for preprocessing and the response of a motor for driving a table or the like. It is for this reason that the above-mentioned data prereading technique has come into use. With this technique, as illustrated in FIG. 1, numerically controlled machining based on the current block, for example, the first block B1, is in progress as indicated at W1, when NC data in the succeeding block B2 is preread. Preprocessing based on the succeeding block B2 is performed concurrently with the NC machining control W1 based on the current block B1. Then, simultaneously with the completion of the NC machining control W1 specified by the current block B1, NC machining control W2 is performed on the basis of the NC data in the succeeding block B2. Therefore, according to the data prereading method, movement based on the NC data in the succeeding block can be executed immediately, without waiting for the completion of preprocessing following movement based on the NC data in the current block. The result is a more efficient machining operation.

Figure 2:
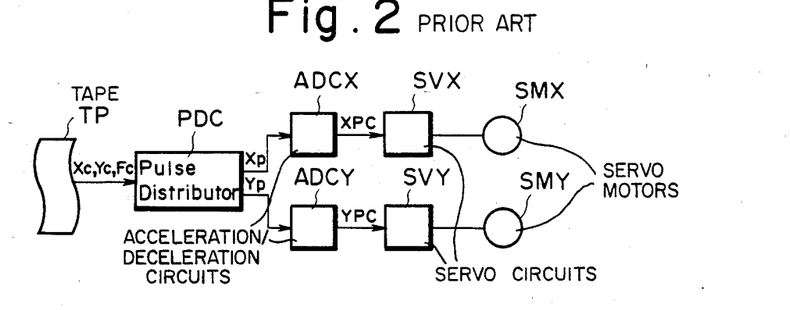
FIG. 2 is a simplified block diagram of a numerical control servo loop.

The servo loop of a numerical control system is provided with an acceleration/deceleration circuit connected to the output of a pulse distributor in order to prevent a mechanical system from sustaining a shock at the beginning and end of movement. The circuit serves to accelerate and then decelerate the pulse rate of a pulse train generated by the pulse distributor as the result of a pulse distribution computation. FIG. 2 is a block diagram of a servo loop of the kind described above, adapted for the control of two axes, namely the X and Y axes. A pulse distributor PDC receives, as inputs thereto, data Xc, Yc indicating commanded amounts of movement along the X and Y axes, as well as a commanded feed speed Fc, these being input from an NC tape TP. Using these inputs, the pulse distributor PDC performs a known pulse distribution computation to generate distributed pulses Xp, Yp that are applied to acceleration/deceleration circuits ADCX, ADCY, respectively. The acceleration/deceleration circuits ADCX, ADCY function to accelerate the pulse rate of the distributed pulses up to the commanded speed Fc when the pulses begin to arrive and to decelerate the pulse rate when the arrival of distributed pulses is interrupted. Pulses XPC, YPC resulting from the acceleration and deceleration operation of the circuits ADCX, ADCY are applied to respective servo circuits SVX, SVY to movement servomotors SMX, SMY for drive along the X and Y axes, respectively.

Figure 3:
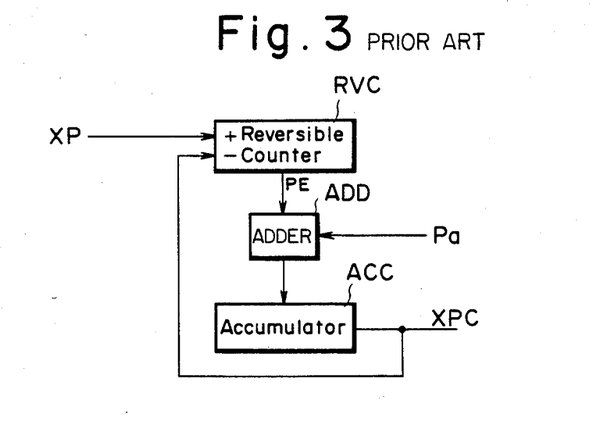
FIG. 3 is a block diagram of an acceleration/deceleration circuit.

A block diagram of and acceleration/deceleration circuit ADCX is illustrated in FIG. 3. It should be noted that the circuit ADCX can control acceleration and deceleration exponentially or linearly. Reference symbol RVC represents a reversible counter for counting up the distributed pulses Xp and for counting down the output pulses XPC. Reference symbol ACC denotes an n-bit accumulator and ADD an adder for adding the contents PE of the reversible counter RVC to the contents of the accumulator ACC whenever a pulse Pa is generated at a constant frequency Fa. When the value in the accumulator ACC exceeds the capacity ($2^n$) thereof, the pulses XPC emerge from the accumulator at a pulse rate Fc' given by the following:

$$Fc' = Fc[1 - exp(-kt)]$$

Thus the pulse rate Fc' increases exponentially during rise time (acceleration), and decreases exponentially during decay time (deceleration). The acceleration/deceleration circuit ADCX or ADCY can also be constructed to control acceleration and deceleration linearly, in which case Fc' will be given by:

$$Fc' = Fc(kt)$$

and the pulse rate will increase linearly during rise time and decrease linearly during decay time.

Figure 4:
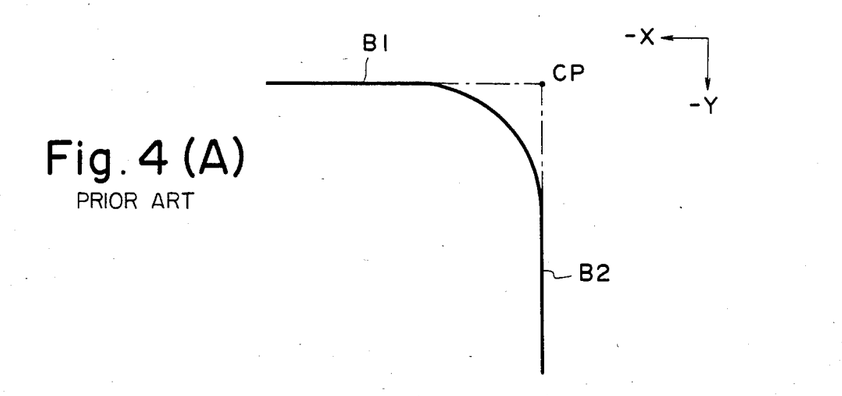
FIGS. 4(A) to 4(C) are graphical representations of the cutting of a corner using a coventional method of control.

Since the foregoing prereading and acceleration/deceleration control techniques are applied in numerical control systems, an unfortunate result is the rounding of corners when the system is used in the cutting of corner portions. This phenomenon will be described with reference to FIG. 4.

In FIG. 4(A), movements according to blocks B1 and B2 of NC data preceding and following a corner CP intersect at right angles at the corner CP. The preceding block B1 comands movement parallel to the X axis and the following block B2 commonds movement parallel to the Y axis. When cutting a workpiece in accordance with the preceding block B1, the cutting speed along the X-axis decreases exponentially from a commanded speed $Vi_x$ in the vicinity of the corner CP, as shown in FIG. 4(B). On the other hand, a pulse distribution computation based on the command data in the following block B2 starts from a time $t_o$, which is the instant at which deceleration begins in the preceding block B1 (namely the instant at which the pulse distribution computation ends in block B1), as shown in FIG. 4(C). Accordingly, starting at time $t_o$, the cutting speed along the Y axis increases exponentially toward a commanded speed $Vi_y$. In consequence, the corner portion is cut to a rounded configuration as shown by the solid line in FIG. 4(A), rather than to the desired 90° angle.

A tool path is dependent upon the following:
(a) feed speeds ($Vi_x$ and $Vi_y$) of the tool;
(b) corner angle $\theta$;
(c) time constant T1 of acceleration/deceleration during cutting; and
(d) type of motor used. In other words, the difference between a tool path and a commanded path depends upon these parameters. The difference between the tool path and commanded path results in a machining error which is required to be held within allowable limits. To this end, according to the prior art, programming is performed during the creation of an NC tape to set the feed speeds so that the error will fall within the allowable limits, or a dwell command (G04) is inserted between items of command data corresponding to the blocks on either side of a corner, whereby interpolation for a succeeding block starts upon the completion of deceleration in the preceding block, thereby eliminating rounding of the corner portion.

However, the former method involves complicated programming, while the latter method, in which pulse distribution in a succeeding block starts at the end of deceleration, requires a considerable length of time to pass the corner portion. As a result, when a cutting machine such as a gas or plasma cutter is used to cut a workpiece, the corner portion cannot be cut sharply and may instead be cut inaccurately.

SUMMARY OF THE INVENTION

Accordingly, an object of the present invention is to provide a numerical control method and an apparatus therefor capable of improving the accuracy with which a corner portion is cut, particularly when applied to a gas or plasma cutting machine.

Another object of the present invention is to provide a numerical control method and an apparatus capable of shortening the time required for cutting a corner portion and cutting a corner portion at a sharp angle.

The present invention is directed to a numerical control method and apparatus wherein first and second tool control blocks precede and follow a corner at a tool path, with the blocks being controlled sequentially. According to the invention, a pulse distribution computation based on NC command data in the second block is not executed at the instant that a pulse distribution computation based on NC command data in the first block ends. Rather, the pulse distribution computation based on the NC command data in the second block is performed starting at the instant that a feed speed based on the NC command data in the first block is reduced to a prescribed speed by being decelerated.

Other features and advantages of the present invention will be apparent from the following description taken in conjunction with the accompanying drawings.

DESCRIPTION OF THE PREFERRED EMBODIMENTS

Good precision, cutting performed by a machine such as a gas or plasma cutter is achieved by effecting movement in such a manner that feed speed does not drop below a certain speed. Therefore, according to a feature of the present invention, interpolation for a succeeding block of data starts after the feed speed in the preceding block is decelerated to a prescribed speed.

FIG. 5(A) illustrates the shape of a corner portion on a tool path and FIGS. 5(B) and 5(C) depict feed speed along the X and Y axes, respectively. The solid lines correspond to the prior-art feed speeds and the dashed line corresponds to the feed speed according to the present invention. In FIG. 5(A), movements commanded by blocks B1 preceding and B2 following a corner CP intersect at right angles at the corner CP. The movement commanded by the preceding block B1 is parallel to the X axis and the movement commanded by the following block B2 is parallel to the Y axis.

According to the present invention, a pulse distribution computation based on command data in the succeeding block B2 is not executed at the instant $t_0$ (FIGS. 5(B) and 5(C) which is the time at which a pulse distribution computation based on the command data in the preceding block B1 ends. Rather, a pulse distribution computation based on the command data in the succeeding block B2 is performed starting at time $t_1$, which is the instant at which the feed speed based on the command data in the preceding block is reduced to a prescribed speed Vs by being decelerated. As a result, the torch of a gas cutting machine or the like will cut the corner portion quickly to a high degree of accuracy, without cutting the corner to an overly rounded shape.

Figure 5:
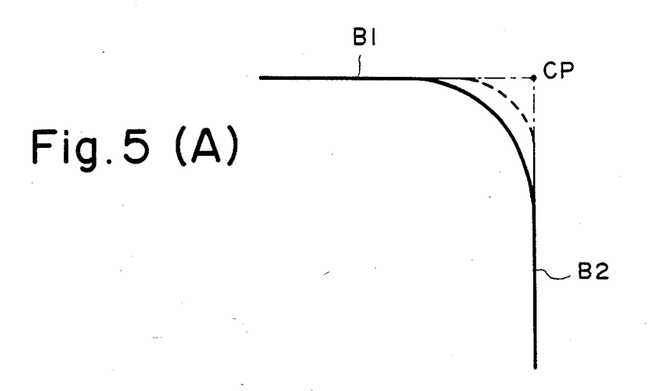
FIGS. 5(A) to 5(C) are graphical representations of the cutting of a corner using an embodiment of the present invention.
Figure 6:
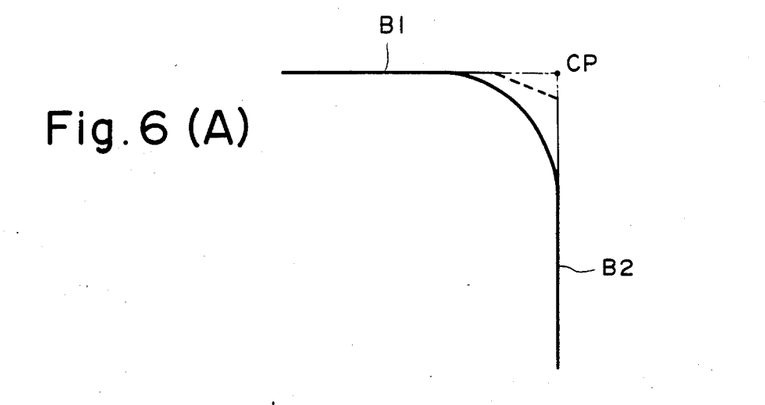
FIGS. 6(A) to (C) are graphical representations of the cutting of a corner using another embodiment of the present invention.

FIGS. 6(A) to 6(C) illustrate a cutting operation by another embodiment of the present invention. As in FIG. 5, FIG. 6(A) illustrates the shape of a corner portion on a tool path and FIGS. 6(B) and 6(C) depict feed speed along the X and Y axes, respectively. The solid lines correspond to the prior-art feed speeds, and the dashed line to the feed speeds according to the present invention. In this embodiment, unlike that of FIG. 5, acceleration and deceleration are performed linearly at the corner portion of the tool path. The pulse distribution computation based on the command data in the succeeding block B2 is performed starting from time $t_1$, which is the instant at which the feed speed based on the command data in the preceding block B1 attains a prescribed speed Vs by being decelerated linearly, rather than exponentially. As a result, the corner portion can be cut with even greater accuracy in comparison with the exponential acceleration and deceleration illustrated in FIG. 5. The prescribed speed Vs can be selected in accordance with the feed speed of the tool, the angle of the corner portion and the type of motor used.

Figure 7:
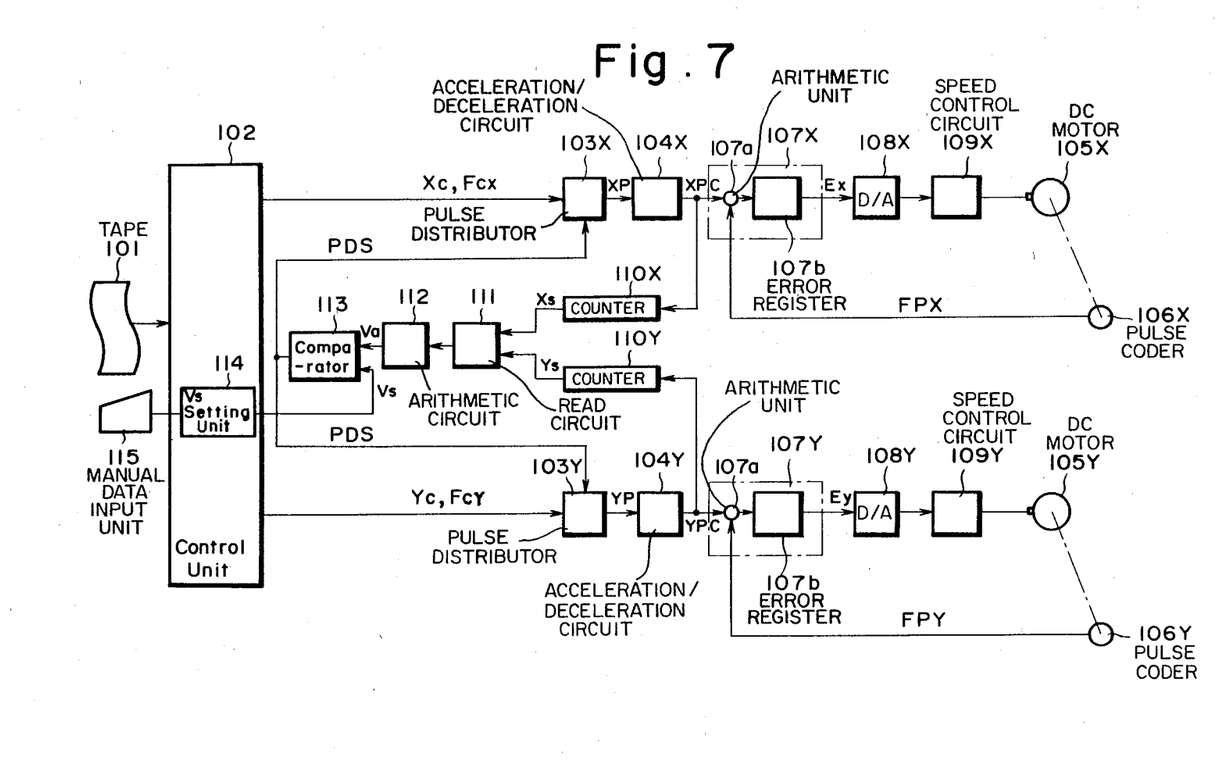
FIG. 7 is a block diagram of an apparatus employing the method of the present invention.

Reference will now be had to the block diagram of FIG. 7 illustrating an apparatus employing a numerical control method according to the present invention. Numeral 101 denotes a paper tape in which numerical control (NC) data are punched. Numeral 102 denotes a control unit which causes a tape reader (not shown) to read the NC command data from the paper tape 101 and which decodes the NC data, delivering, e.g., M, S and T function commands to the machine through a power magnetics unit (not shown) and move commands to pulse distributors 103X, 103Y. The control unit 102 is further adapted to store the NC data in a buffer register (not shown). The pulse distributors 103X, 103Y execute well-known pulse distribution computations on the basis of move commands Xc, Yc from the control unit 102 and generate distributed pulses XP, YP, respectively, at a frequency corresponding to respective command speeds $Fc_x$, $Fc_y$ received from the control unit 102. Numerals 104X, 104Y designate respective acceleration/deceleration circuits for generating pulse trains XPC, YPC by accelerating the pulse rates of the distributed pulse trains XP, YP, respectively, exponentially or linearly at the occurrence of these pulse trains XP and XP and for decelerating these pulse rates exponentially or linearly when the distributed pulse trains stop. Numerals 105X, 105Y denote DC motors for transporting a table or tool (not shown). Pulse coders 106X, 106Y generate one feedback pulse FPX, FPY, respectively, each time the corresponding DC motor 105X or 105Y rotates by a predetermined amount.

The pulse trains XPC, YPC from the circuits 104X, 104Y are applied to respective error calculating and storing units 107X, 107Y, each of which comprises, for example, a reversible counter. The units 107X, 107Y compute the differences Ex, Ey between the number of pulses XPC and YPC, received from the acceleration/deceleration circuits 104X and 104Y, respectively, and the number of feedback pulses FPX, FPY and are further adapted to store Ex and Ey, respectively. These error calculating and storing units 107X and 107Y may be constructed, as shown in FIG. 7, of an arithmetic circuit 107a for calculating the difference Ex or Ey between the numbers of pulses XPC, FPX, or YPC, FPY, input thereto, and an error register 107b for storing the error Ex or Ey. More specifically, assuming that the DC motors 105X, 105Y are rotating in the forward direction in response to a previous command, the error calculating and storing units 107X, 107Y operate in such a manner that each time the input pulses XPC, YPC are generated, the input pulses XPC and YPC are counted up by the arithmetic circuits 107a, while each time the feedback pulses FPX, FPY are generated, the contents of the units 107X, 107Y are decremented and that the differences Ex, Ey between the number of input pulses XPC and YPC and the number of feedback pulses FPX and FPY are stored in the error registers 107b.

Numerals 108X, 108Y denote digital-to-analog converters (D/A) for generating analog voltages proportional to the contents of the error registers 107b. These analog voltages are applied to speed control circuits 109X, 109Y. Numerals 110X, 110Y designate counters for counting the pulses XPC, YPC generated by the acceleration/deceleration circuits 104A, 104Y, respectively. The values Xs, Ys counted by the counters 110X, 110Y are applied to a read circuit 111 which periodically reads the counted values Xs, Ys and then clears the counters 110X, 110Y. The output of the read circuit 111 is connected to an arithmetic circuit 112 which computes actual speed Va by performing the operation $k\sqrt{Xs^2+Ys^2}$. A comparator 113 compares the actual speed Va with a preset speed Vs (FIG. 6), and delivers a pulse distribution start signal PDS to the pulse distributors 103X, 103Y when the actual speed Va falls below the preset speed Vs.

When an item of NC data read in from the NC tape 101 is a cutting command [the NC data in block B1 of FIG. 5(A)], the control unit 102 responds by computing an incremental value $X_c$ that is applied, together with a speed command $Fc_k$, to the pulse distributor 103X. The control unit 102 also causes the tape reader (not shown) to read in the NC data in the succeeding block B2. The pulse distributor 103X produces the distributed pulses XP by performing a pulse distribution computation based on the received incremental value $X_c$ and speed command $Fc_x$. Upon receiving the pulses XP, the acceleration/deceleration circuit 104X accelerates and decelerates the pulse rate thereof and applies the resulting pulse train XPC to the error calculating and storing circuit 107X. Thus, the content of the error register 107b becomes non-zero, so that the D/A converter 108X provides a voltage and the motor 105X is driven by the speed control circuit 109X to move a table. When the motor 105X has rotated by a predetermined amount, the feedback pulse FPX is generated by the pulse coder 106X and is applied to the error calculating and storing unit 107X, with the error register 107b storing the difference Ex between the number of pulses XPC and the number of feedback pulses FPX. Thenceforth, the table is servo-controlled in such a manner that the difference Ex approaches zero, with the table being moved to a target position or transported along a commanded path at the speed $Fc_x$. When the number of generated distributed pulses corresponds to the commanded amount of movement, the pulse distribution operation performed by the pulse distributor 103X ceases and the traveling speed of the table along the X axis is reduced. Meanwhile, the counters 110X, 110Y are counting the numbers of pulses XPC, YPC generated at discrete times by the acceleration/deceleration circuits 104X, 104Y. The numbers of counted pulses, namely Xs, Ys, which are equivalent to the speeds along the X and Y axes, respectively, are read by the read circuit 112 at discrete times and are applied to the arithmetic circuit 112, which performs the operation $Va = k\sqrt{Xs^2 + Ys^2}$. The magnitude of Va is approximately equal to the actual speed and is compared with the prescribed speed Vs by the comparator 112. As mentioned above, the prescribed speed Vs can be set appropriately by taking into consideration the feed speed of the tool, the angle of the corner portion and the type of motor used. Thus, a sitting unit 114 is provided for setting the prescribed speed Vs in response to a suitable value entered from a manual data input unit 115.

When the result of the comparison operation performed by the comparator 113 is $Vs \geq Va$, the comparator applies the pulse distribution start signal PDS to the pulse distributors 103X, 103Y so that a pulse distribution computation based on the next block of NC data will be performed. The control unit 102 controls the tape reader, causing it to read in NC data from the paper tape 101 one block after another. The foregoing operations are then repeated.

Thus, in accordance with the present invention as described and illustrated hereinabove, rounding of a corner on a tool path is suppressed without excessively prolonging the time required to traverse the corner. As a result, a corner can be cut with great accuracy even when performed by a gas or plasma cutting machine.

Many apparently widely different embodiments of the present invention can be made without departing from the spirit and scope thereof and it is to be understood that the invention is not limited to the specific embodiments herein except as defined in the appended claims.

What we claim is:

1. A numerical control method including performing machining control based on first numerical control command data in a first tool control block, reading second numerical control command data in a second tool control block during the machining control performed based on the first numerical control command data, the first and second tool control blocks preceding and following, respectively, a corner on a tool path, preprocessing the second numerical control command data in the second tool control block concurrently with the machining control based on the first numerical control command data in the first tool control block, and performing machining control based on the second numerical control command data in the second tool control block, when the machining control based on the first numerical control command data in the first tool control block ends, said method comprising the steps of:

(a) decelerating a tool feed speed control when a transition is made to the second tool based on the first numerical control command data in the first tool control block;

(b) sensing when the feed speed is reduced to a prescribed speed greater than zero; and (c) starting interpolation for the second tool control block, when the prescribed speed is sensed in step (b), by accelerating the tool feed speed based on the second numerical control command data in the second tool control block.

2. A numerical control method according to claim 1, wherein the decelerating in step (a) and the accelerating in step (c) of the tool feed speed occur at an exponential rate.

3. A numerical control method according to claim 1, wherein the decelerating in step (a) and the accelerating in step (c) of the tool feed speed occur at a linear rate.

4. A numerical control method according to claim 1, wherein the prescribed speed is adjustable.

5. A numerical control apparatus for controlling first and second DC motors which drive a workpiece along first and second axes, respectively, and generate feedback pulse trains, said apparatus comprising:

control means for reading numerical control command data and decoding the numerical control command data to produce first and second move commands along the first and second axes;

pulse distributing means, operatively connected to said control means, for generating first and second distributed pulse trains in dependence upon the first move command and third and fourth distributed pulse trains in dependence upon the second move command;

acceleration/deceleration speed control means, operatively connected to said pulse distributing means, for decelerating speed along the first and second axes when the first and second distributed pulse trains end and for accelerating the speed along the first and second axes when the third and fourth distributed pulse trains start, by generating a number of pulses corresponding to the first and second axes;

feedback control means, operatively connected to said acceleration/deceleration speed control means and the first and second DC motors, for executing control to eliminate errors between one of the first and third pulse trains and the feedback pulse train from the first DC motor and between one of the second and fourth pulse trains and the feedback pulse train from the second DC motor;

actual speed output means, operatively connected to said acceleration/deceleration speed control means, for outputting an actual speed, comprising:

first and second counters, operatively connected to said acceleration/deceleration speed control means, for counting the number of pulses generated by said acceleration/deceleration speed control means corresponding to the first and second axes, respectively;

a read circuit, operatively connected to said first and second counters, for reading the contents of said first and second counters at discrete times; and an actual speed arithmetic circuit, operatively connected to said read circuit, for computing and outputting the computed actual speed;

prescribed speed setting means for setting a prescribed speed; and comparison means, operatively connected to said pulse distributing means, said actual speed arithmetic circuit and said prescribed speed setting means, for comparing the computed actual speed and the prescribed speed and for delivering a pulse distribution start signal to said pulse distributing means when the computed actual speed falls below the prescribed speed.

6. A numerical control apparatus according to claim 5, further comprising manual data input means, operatively connected to said prescribed speed setting means, for adjusting the prescribed speed.

7. A numerical control apparatus using numerical control data to control first and second DC motors, comprising:

speed setting means for setting a threshold speed;

control means for producing first and second moves commands in dependence upon the numerical control data;

speed control means, operatively connected to said control means and the first and second motors, for controlling the first and second motors in dependence upon the first and second move commands by decelerating the first and second motors when a first move commanded by the first move command is ending and accelerating the first and second motors when a second move commanded by the second move command is starting;

actual speed determining means, operatively connected to said speed control means, for determining a combined actual speed of the first and second motors acting in combination; and comparison means, operatively connected to said speed setting means, said actual speed determining means and said speed control means, for instructing said speed control means to start accelerating the second move when the combined actual speed of the first move is less than or equal to the threshold speed.

8. A numerical control apparatus according to claim 7, wherein said actual speed determining means comprises:

first and second motor speed registers, operatively connected to said speed control means, for storing data indicating actual speeds of the first and second motors, respectively; and actual speed calculating means, operatively connected to said first and second motor speed registers and said comparison means, for calculating the combined actual speed of the first and second motors acting in combination.

9. A numerical control apparatus according to claim 8, wherein said first and second motor speed registers comprise first and second counters, operatively connected to said speed control means, for counting the pulses in the accelerated pulse train, and wherein said actual speed calculating means comprises:

a read circuit, operatively connected to said first and second counters, for periodic reading and resetting of the contents of said first and second counters; and an arithmetic circuit, operatively connected to said read circuit and said comparision means, for calculating the combined actual speed in dependence upon the contents of said first and second counters.

* * * * *

UNITED STATES PATENT AND TRADEMARK OFFICE
CERTIFICATE OF CORRECTION

PATENT NO. : 4,600,985

DATED : July 15, 1986

INVENTOR(S) : Nozawa et al.

It is certified that error appears in the above-identified patent and that said Letters Patent is hereby corrected as shown below:

Col. 3, line 29, "at" should be --of--.

line 64, "precision, cutting performed"

should be --cutting precision--.

Col. 8, line 21, "moves" should be --move--.

Signed and Sealed this

Twenty-fifth Day of November, 1986

Attest:

DONALD J. QUIGG

*Attesting Officer*       *Commissioner of Patents and Trademarks*